United States Patent
Shan (10) Patent No.: US 10,782,577 B2
(45) Date of Patent: Sep. 22, 2020

(54) DISPLAY PANEL AND METHOD FOR REDUCING CAPACITIVE LOAD

(71) Applicant: HKC Corporation Limited, Shenzhen, Guangdong (CN)

(72) Inventor: Jianfeng Shan, Shenzhen (CN)

(73) Assignee: HKC Corporation Limited, Shenzhen, Guangdong (CN)

( * ) Notice: Subject to any disclaimer, the term of this patent is extended or adjusted under 35 U.S.C. 154(b) by 0 days.

(21) Appl. No.: 16/329,179

(22) PCT Filed: Jun. 28, 2018

(86) PCT No.: PCT/CN2018/093366
§ 371 (c)(1),
(2) Date: Feb. 27, 2019

(87) PCT Pub. No.: WO2019/169809
PCT Pub. Date: Sep. 12, 2019

(65) Prior Publication Data
US 2020/0012162 A1    Jan. 9, 2020

(30) Foreign Application Priority Data

Mar. 8, 2018   (CN) .......................... 2018 1 0190567

(51) Int. Cl.
*G02F 1/1362*   (2006.01)
*G02F 1/1343*   (2006.01)
(Continued)

(52) U.S. Cl.
CPC ........ *G02F 1/136286* (2013.01); *G02F 1/137* (2013.01); *G02F 1/13439* (2013.01);
(Continued)

(58) Field of Classification Search
CPC .... G02F 1/1343; G02F 1/1333; G02F 1/1362; G02F 1/1345; G02F 1/136213;
(Continued)

(56) References Cited

U.S. PATENT DOCUMENTS

2006/0132682 A1* 6/2006 Yang ................. G02F 1/133555
349/114
2009/0244422 A1* 10/2009 Okazaki ................ G02F 1/1339
349/42

(Continued)

FOREIGN PATENT DOCUMENTS

CN    103018991 A    4/2013
CN    204314578 U    5/2015
(Continued)

*Primary Examiner* — Thoi V Duong
(74) *Attorney, Agent, or Firm* — Muncy, Geissler, Olds & Lowe, P.C.

(57) ABSTRACT

This application provides a display panel includes: a first substrate; a first conducting layer formed on the first substrate; a first passivation layer formed on the first conducting layer, and covering the first substrate; a second passivation layer formed on the first passivation layer; and a first electrode layer formed on the second passivation layer, and covering a part of the first conducting layer and the first passivation layer; a second substrate, disposed opposite to the first substrate; a liquid crystal layer, located between the first substrate and the second substrate; and a second electrode layer formed on the second substrate, where a conductive bridge hole is formed on a wire of the first conducting layer, and the first electrode layer is covered on the first conducting layer; and a voltage signal is transmitted to the first electrode layer and the second electrode layer through the conductive bridge hole.

9 Claims, 8 Drawing Sheets

(51) Int. Cl.
*G02F 1/1333* (2006.01)
*G02F 1/137* (2006.01)
*G02F 1/1345* (2006.01)
*G02F 1/1368* (2006.01)

(52) U.S. Cl.
CPC ...... *G02F 1/134309* (2013.01); *G02F 1/1368* (2013.01); *G02F 1/13454* (2013.01); *G02F 2001/136295* (2013.01)

(58) Field of Classification Search
CPC ........... G02F 1/136227; G02F 1/13454; G02F 1/136286; G02F 1/1368; G02F 1/13452; G02F 1/134309; G02F 1/13439; G02F 1/133345; G02F 1/133514; G02F 1/137; G02F 2001/134372; G02F 2001/136295; G02F 2201/121; G02F 1/13306; G09G 2300/0426; G09G 2300/0408; G09G 3/3677; G09G 3/3607; G09G 3/3696; G06F 3/044
See application file for complete search history.

(56) References Cited

U.S. PATENT DOCUMENTS

| | | | |
|---|---|---|---|
| 2011/0193816 A1* | 8/2011 | Kitakado | G06F 3/0412 345/174 |
| 2013/0050605 A1* | 2/2013 | Moriwaki | G02F 1/1339 349/43 |
| 2018/0107045 A1* | 4/2018 | Wang | H01L 27/124 |

FOREIGN PATENT DOCUMENTS

| | | |
|---|---|---|
| JP | 2002-341381 A | 11/2002 |
| JP | 2005-091495 A | 4/2005 |

* cited by examiner

DISPLAY PANEL AND METHOD FOR REDUCING CAPACITIVE LOAD

BACKGROUND

Technical Field

This application relates to the field of a circuit load design, and in particular, to a display panel and a method for reducing a capacitive load.

Related Art

In an active matrix liquid crystal display, each pixel includes a thin film transistor (TFT), a gate of the transistor is connected to a scanning line in a horizontal direction, a source is connected to a data line in a vertical direction, and a drain is connected to a pixel electrode. If a scanning line in a horizontal direction provides a sufficient positive voltage, all transistors on the scanning line are turned on, and a pixel electrode on the scanning line is connected to a data line in a vertical direction, to write a signal voltage of the data line into each pixel capacitor of the scanning line, and control the light transmittance of liquid crystals of different pixels to achieve an effect of controlling colors.

For a conventional gate drive circuit used to drive each pixel transistor gate, a shift register circuit is used to generate continuous drive signals to a scanning line, to control on and off of each pixel transistor in a display. For example, the shift register circuit is directly manufactured on an array substrate, to replace a drive chip manufactured by externally connecting to a silicon chip, and this technology is also referred to as a gate driver on array (GOA) technology. Further, manufacturing the shift register circuit directly on a border of a display panel can decrease manufacture procedures, and reduce product costs, to further improve the high integration of an active matrix panel, so that the panel can be thinner.

A technique architecture of the display panel is classified based on a gate drive design, and may be classified into two types, an SOC (System on chip) and a GOA (Gate driver on array). From the perspective of a product requirement, a smaller border is expected. Therefore, compared with a panel design using the SOC, the GOA has a smaller border. The GOA is an important technology in the panel design, and a main advantage is capable of sparing a gate drive integrated circuit, thereby reducing the product costs. Therefore, a GOA product is certainly a mainstream trend in the future. Therefore, how to resolve the problem of an excessively large circuit load is a great challenge to the GOA product in the current market.

SUMMARY

To resolve the foregoing technical problem, the objective of this application is to provide a display panel, including: a first substrate; a first conducting layer formed on the first substrate; a first passivation layer formed on the first conducting layer, and covering the first substrate; a second passivation layer formed on the first passivation layer; and a first electrode layer formed on the second passivation layer, and covering a part of the first conducting layer and the first passivation layer; a second substrate, disposed opposite to the first substrate; a liquid crystal layer, located between the first substrate and the second substrate; and a second electrode layer formed on the second substrate, where a conductive bridge hole is formed on a wire of the first conducting layer, and the first electrode layer is covered on the first conducting layer; and a voltage signal is transmitted to the first electrode layer and the second electrode layer through the conductive bridge hole.

Another objective of this application is to provide a display panel, including: a first substrate; a first conducting layer formed on the first substrate; a first passivation layer formed on the first conducting layer, and covering the first substrate; a second passivation layer formed on the first passivation layer; and a first electrode layer formed on the second passivation layer, and covering a part of the first conducting layer and the first passivation layer; a second substrate, disposed opposite to the first substrate; a liquid crystal layer, located between the first substrate and the second substrate, formed on the first electrode layer, and covering the second passivation layer; and a second electrode layer formed on the second substrate, where a conductive bridge hole is formed on a wire of the first conducting layer, and the first electrode layer is covered on the first conducting layer; a voltage signal is transmitted to the first electrode layer and the second electrode layer through the conductive bridge hole; and a capacitor is formed between the first conducting layer and the second electrode layer.

Another objective of this application is to provide a method for reducing a capacitive load, including: providing a first substrate; forming a first conducting layer on the first substrate; forming a first passivation layer on the first conducting layer, where the first passivation layer covers the first substrate; forming a second passivation layer on the first passivation layer; and forming a first electrode layer on the second passivation layer, where the first electrode layer covers a part of the first conducting layer and the first passivation layer; providing a second substrate, disposed opposite to the first substrate; forming a liquid crystal layer on the first electrode layer, where the liquid crystal layer is located between the first substrate and the second substrate, and covers the second passivation layer; and forming a second electrode layer on the second substrate, where a conductive bridge hole is formed on a wire of the first conducting layer, and the first electrode layer is covered on the first conducting layer; and a voltage signal is transmitted to the first electrode layer and the second electrode layer through the conductive bridge hole, so that a medium coefficient of the liquid crystal layer is approximate to a dielectric coefficient of a parallel vector.

The objective and the solution to the technical problem of this application are implemented by using the following technical solutions.

In an embodiment of this application, the first conducting layer further includes a first wire, a second wire, and a third wire.

In an embodiment of this application, at least one conductive bridge hole is formed on the first wire.

In an embodiment of this application, at least one conductive bridge hole is formed on the second wire.

In an embodiment of this application, at least one conductive bridge hole is formed on the third wire.

In an embodiment of this application, the liquid crystal layer has a medium coefficient, and the medium coefficient includes a dielectric coefficient of a parallel vector and a dielectric coefficient of a vertical vector.

In an embodiment of this application, in the method for reducing a capacitive load, the first conducting layer further includes a first wire, a second wire, and a third wire, and at least one conductive bridge hole is formed on each of the wires.

In an embodiment of this application, in the method for reducing a capacitive load, the liquid crystal layer has a medium coefficient, and the dielectric coefficient includes a dielectric coefficient of a parallel vector and a dielectric coefficient of a vertical vector.

According to this application, a gate drive circuit wire load and panel power can be reduced.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, modules with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is referred to be "on" "another component", the component may be directly on the another component, or there may be an intermediate component.

In addition, throughout this specification, unless otherwise explicitly described to have an opposite meaning, the word "include" is understood as including the component, but not excluding any other component. In addition, throughout this specification, "on" means that one is located above or below a target component and does not necessarily mean that one is located on the top based on a gravity direction.

To further describe the technical measures taken in this application to achieve the intended application objectives and effects thereof, specific implementations, structures, features, and effects of a display panel and a method for reducing a capacitive load provided according to this application are explained below in detail with reference to the accompanying drawings and preferred embodiments.

Figure 1:
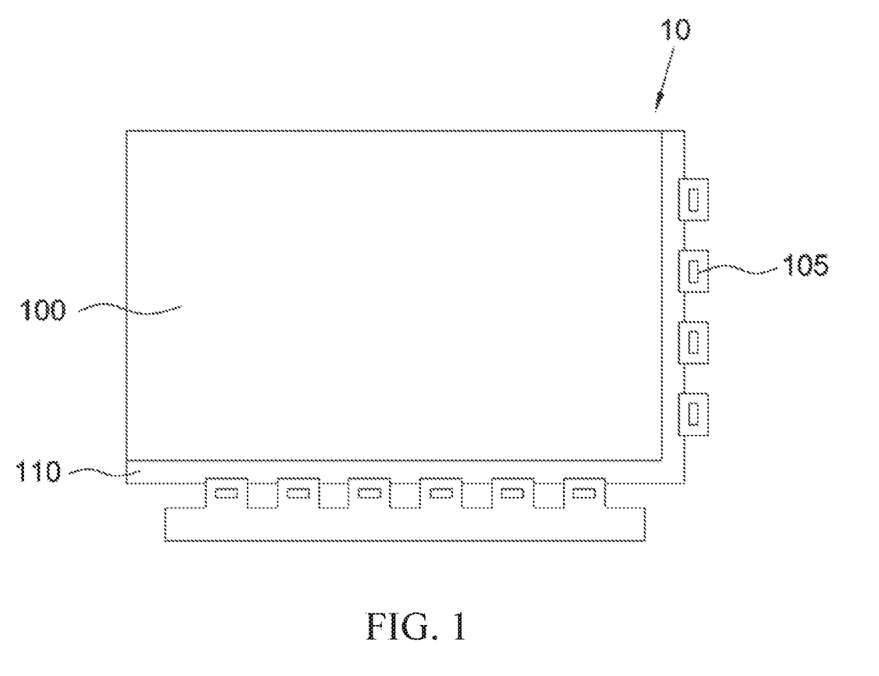
FIG. 1 is a schematic diagram of an exemplary display panel.

FIG. 1 is a schematic diagram of an exemplary display panel. Referring to FIG. 1, an exemplary display panel 10 includes a color filter (CF) substrate 100, an array substrate 110, and a drive chip 105, used to drive a circuit.

Figure 2:
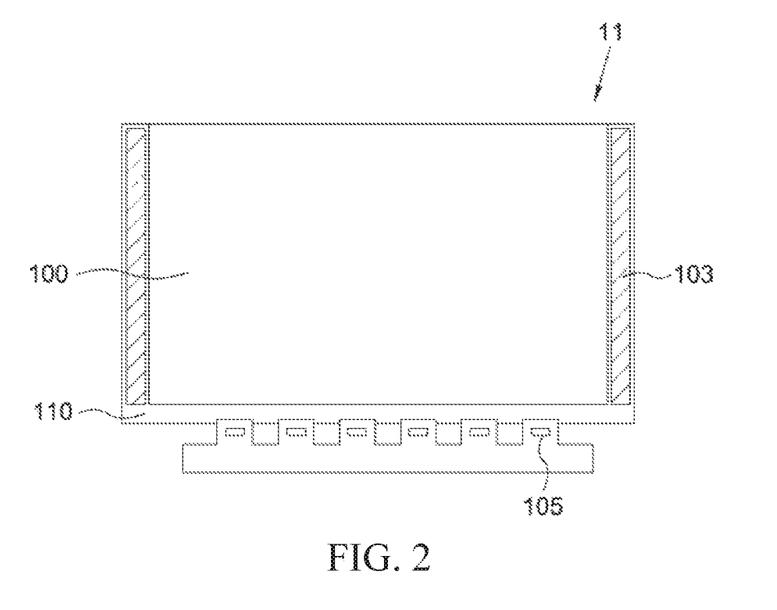
FIG. 2 is a schematic diagram of a display panel according to an embodiment of this application.

FIG. 2 is a schematic diagram of a display panel according to an embodiment of this application. Referring to FIG. 2, in an embodiment of this application, a display panel 11 having a gate driver on array (GOA) includes a CF substrate 100, an array substrate 110, a drive chip 105, and a GOA circuit 103, used to manufacture the gate drive circuit 103 on the array substrate 110. The GOA is configuring a gate drive circuit on the array substrate, to replace a drive chip manufactured by externally connecting to a silicon chip. Because in a GOA technology, the gate drive circuit may be directly configured around a panel, manufacture procedures are simplified, and the integration of the display panel is improved, so that the panel is thinner. With the progress of science and technologies, a double-drive GOA circuit is further developed in the industry of the display panel, and this technology is configuring two groups of GOA circuits at two sides of the panel separately.

Figure 3A:
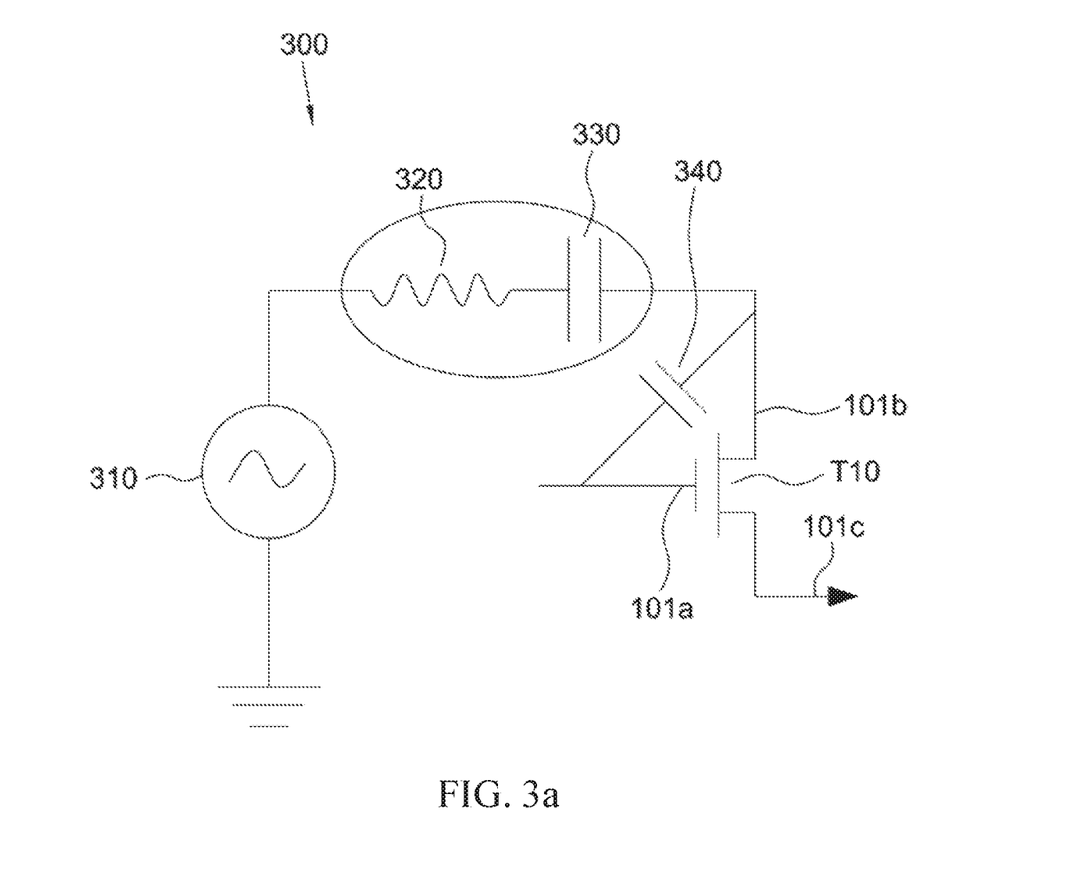
FIG. 3a is a schematic diagram of an exemplary capacitive load circuit.

FIG. 3a is a schematic diagram of an exemplary capacitive load circuit. Referring to FIG. 3a, a capacitive load circuit 300 includes: a clock voltage signal 310, a signal resistor 320, a signal capacitor 330, a parallel capacitor 340, and an active switch T10. A control end 101a of the active switch T10 is electrically coupled to the parallel capacitor 340, a first end 101b of the active switch T10 is electrically coupled to the parallel capacitor 340, and a second end 101c of the active switch T10 is electrically coupled to a gate line.

Figure 3B:
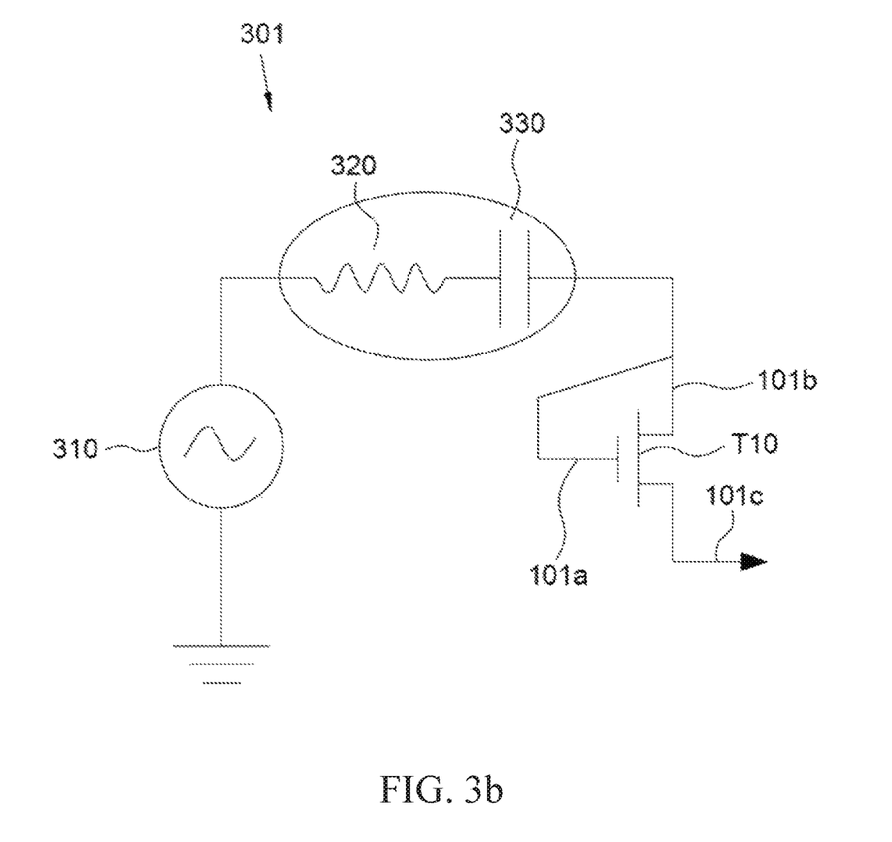
FIG. 3b is a schematic diagram of a capacitive load circuit according to an embodiment of this application.

FIG. 3b is a schematic diagram of a capacitive load circuit according to an embodiment of this application. Referring to FIG. 3b, a capacitive load circuit 301 includes: a clock voltage signal 310, a signal resistor 320, a signal capacitor 330, and an active switch T10. A control end 101a of the active switch T10 is electrically coupled to the signal capacitor 330, a first end 101b of the active switch T10 is electrically coupled to the signal capacitor 330, and a second end 101c of the active switch T10 is electrically coupled to a gate line.

Figure 4A:
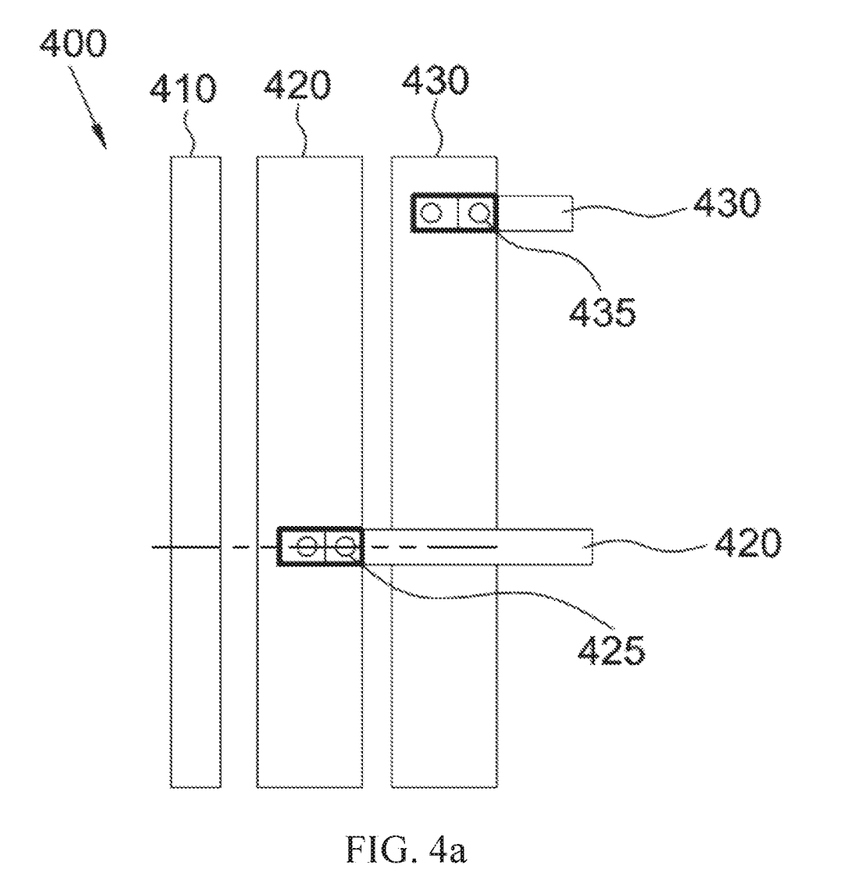
FIG. 4a is a schematic diagram of an exemplary metal wire.
Figure 4B:
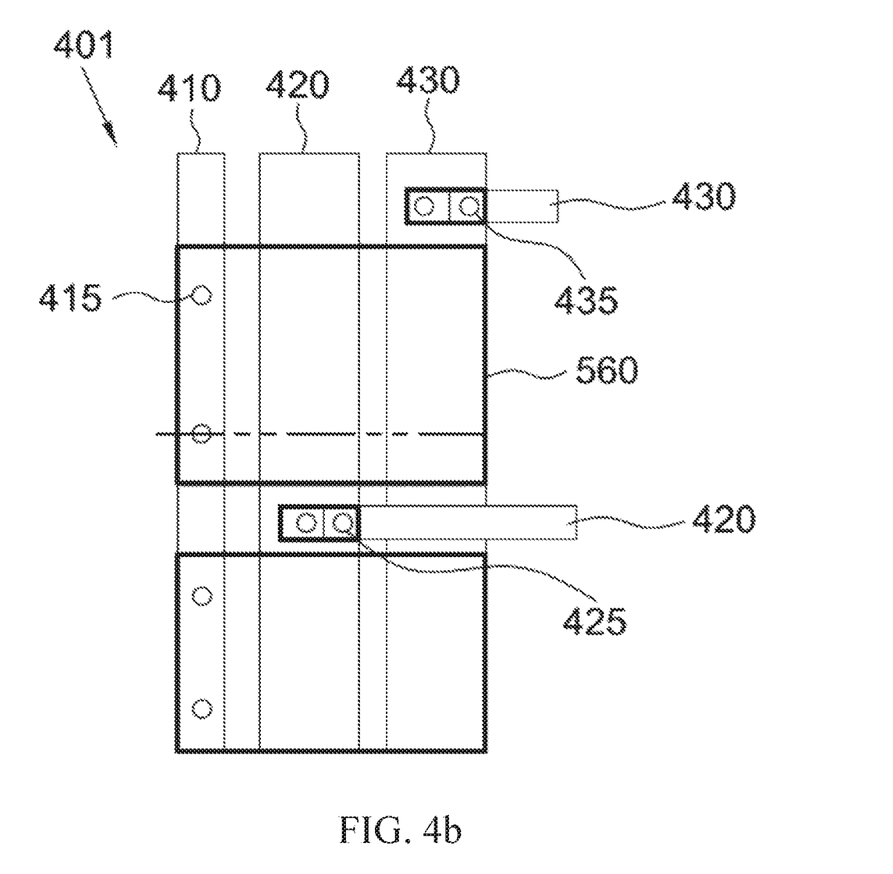
FIG. 4b is a schematic diagram of a metal wire according to an embodiment of this application.
Figure 5A:
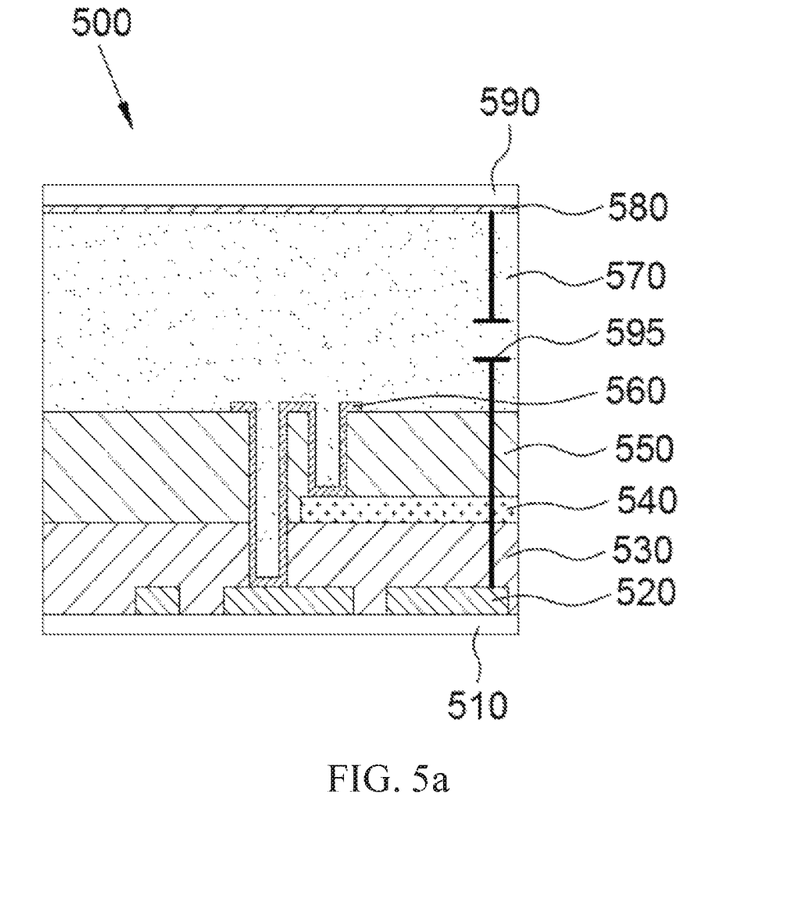
FIG. 5a is a schematic diagram of an exemplary capacitive load apparatus.
Figure 5B:
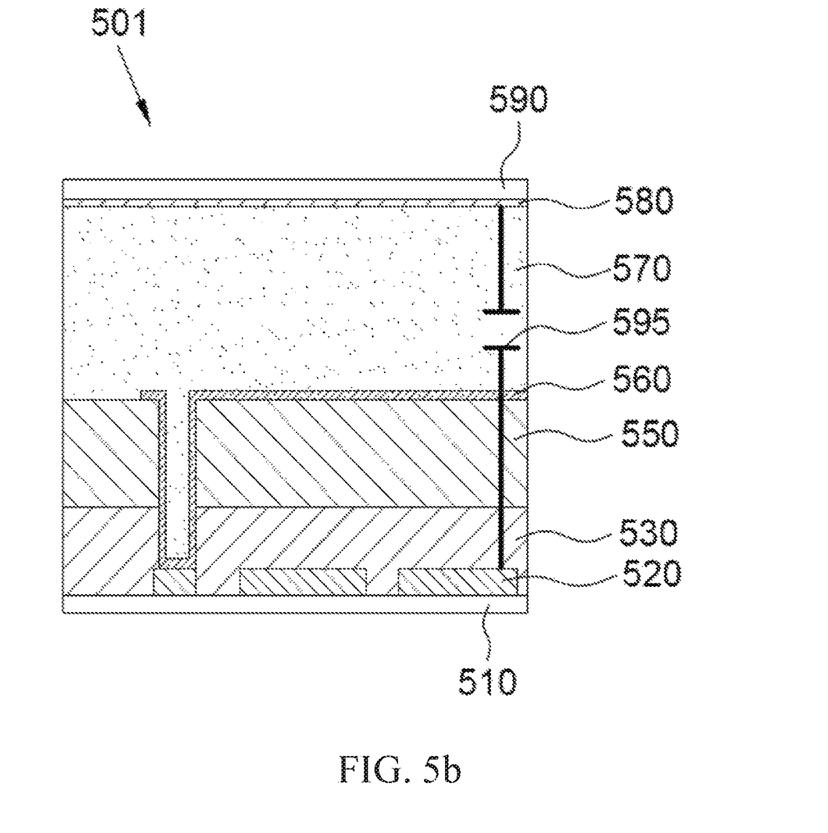
FIG. 5b is a schematic diagram of a capacitive load apparatus according to an embodiment of this application.

FIG. 4a is a schematic diagram of an exemplary metal wire, FIG. 4b is a schematic diagram of a metal wire according to an embodiment of this application, FIG. 5a is a schematic diagram of an exemplary capacitive load apparatus, and FIG. 5b is a schematic diagram of a capacitive load apparatus according to an embodiment of this application. Referring to FIG. 4a, a metal layer wire area 400 includes a first wire 410, a second wire 420, and a third wire 430. A conductive bridge hole 425 is formed on the second wire 420, and a conductive bridge hole 435 is formed on the third wire 430.

Referring to FIG. 4a and FIG. 5a, a display panel 500 includes: a first substrate 510; a first conducting layer 520 formed on the first substrate 510; a first passivation layer 530 formed on the first conducting layer 520, and covering the first substrate 510; a second conducting layer 540 formed on the first passivation layer 530; a second passivation layer 550 formed on the first passivation layer 530; and a first electrode layer 560 formed on the second passivation layer 550, and covering a part of the first conducting layer 520, the second conducting layer 540, and the first passivation layer 530; a second substrate 590, disposed opposite to the first substrate 510; a liquid crystal layer 570, located between the first substrate 510 and the second substrate 590; and a second electrode layer 580 formed on the second substrate 590, where a conductive bridge hole 425 is formed on a wire of the first conducting layer 520; a conductive bridge hole 435 is formed on a wire of the second conducting layer 540; and a capacitor 595 is formed between the first conducting layer 520 and the second electrode layer 580.

In an embodiment of this application, at least one conductive bridge hole 425 is formed on the second wire 420.

In an embodiment of this application, at least one conductive bridge hole 435 is formed on the third wire 430.

Referring to FIG. 4b, a metal layer wire area 401 includes a first wire 410, a second wire 420, and a third wire 430. A conductive bridge hole 415 is formed on the first wire 410, a conductive bridge hole 425 is formed on the second wire 420, and a conductive bridge hole 435 is formed on the third wire 430.

Referring to FIG. 4b and FIG. 5b, a display panel 501 includes: a first substrate 510; a first conducting layer 520 formed on the first substrate 510; a first passivation layer 530 formed on the first conducting layer 520, and covering the first substrate 510; a second passivation layer 550 formed on the first passivation layer 530; and a first electrode layer 560 formed on the second passivation layer 550, and covering a part of the first conducting layer 520 and the first passivation layer 530; a second substrate 590, disposed opposite to the first substrate 510; a liquid crystal layer 570, located between the first substrate 510 and the second substrate 590; and a second electrode layer 580 formed on the second substrate 590, where a conductive bridge hole 415 is formed on a wire of the first conducting layer 520, and the first electrode layer 560 is covered on the first conducting layer 520; and a voltage signal is transmitted to the first electrode layer 560 and the second electrode layer 580 through the conductive bridge hole 415.

In an embodiment of this application, the first conducting layer 520 further includes a first wire 410, a second wire 420, and a third wire 430.

In an embodiment of this application, at least one conductive bridge hole 415 is formed on the first wire 410.

In an embodiment of this application, at least one conductive bridge hole 425 is formed on the second wire 420.

In an embodiment of this application, at least one conductive bridge hole 435 is formed on the third wire 430.

In an embodiment of this application, the liquid crystal layer 570 has a medium coefficient, and the medium coefficient includes a dielectric coefficient of a parallel vector and a dielectric coefficient of a vertical vector.

Referring to FIG. 4b and FIG. 5b, a display panel 501 includes: a first substrate 510; a first conducting layer 520 formed on the first substrate 510; a first passivation layer 530 formed on the first conducting layer 520, and covering the first substrate 510; a second passivation layer 550 formed on the first passivation layer 530; and a first electrode layer 560 formed on the second passivation layer 550, and covering a part of the first conducting layer 520 and the first passivation layer 530; a second substrate 590, disposed opposite to the first substrate 510; a liquid crystal layer 570, located between the first substrate 510 and the second substrate 590, formed on the first electrode layer 560, and covering the second passivation layer 550; and a second electrode layer 580 formed on the second substrate 590, where a conductive bridge hole 415 is formed on a wire of the first conducting layer 520, and the first electrode layer 560 is covered on the first conducting layer 520; a voltage signal is transmitted to the first electrode layer 560 and the second electrode layer 580 through the conductive bridge hole 415; and a capacitor 595 is formed between the first conducting layer 520 and the second electrode layer 580.

In an embodiment of this application, the first conducting layer 520 further includes a first wire 410, a second wire 420, and a third wire 430.

In an embodiment of this application, at least one conductive bridge hole 415 is formed on the first wire 410.

In an embodiment of this application, at least one conductive bridge hole 425 is formed on the second wire 420.

In an embodiment of this application, at least one conductive bridge hole 435 is formed on the third wire 430.

In an embodiment of this application, the liquid crystal layer 570 has a medium coefficient, and the medium coefficient includes a dielectric coefficient of a parallel vector and a dielectric coefficient of a vertical vector.

Referring to FIG. 4b and FIG. 5b, a method for reducing a capacitive load includes: providing a first substrate 510; forming a first conducting layer 520 on the first substrate 510; forming a first passivation layer 530 on the first conducting layer 520, where the first passivation layer 530 covers the first substrate 510; forming a second passivation layer 550 on the first passivation layer 530; and forming a first electrode layer 560 on the second passivation layer 550, where the first electrode layer 560 covers a part of the first conducting layer 520 and the first passivation layer 530; providing a second substrate 590, disposed opposite to the first substrate 510; forming a liquid crystal layer 570 on the first electrode layer 560, where the liquid crystal layer 570 is located between the first substrate 510 and the second substrate 590, and covers the second passivation layer 550; and forming a second electrode layer 580 on the second substrate 590, where a conductive bridge hole 415 is formed on a wire of the first conducting layer 520, and the first electrode layer 560 is covered on the first conducting layer 520; a voltage signal is transmitted to the first electrode layer 560 and the second electrode layer 580 through the conductive bridge hole 415, so that a medium coefficient of the liquid crystal layer is approximate to a dielectric coefficient of a parallel vector (for example, an amplitude of a voltage signal controls a gradient of the dielectric coefficient direction), to effectively reduce a capacitance value of a circuit wire.

Referring to FIG. 4b and FIG. 5b, in an embodiment of this application, the first conducting layer 520 further includes a first wire 410, a second wire 420, and a third wire 430, and at least one conductive bridge hole 415, at least one conductive bridge hole 425, and at least one conductive bridge hole 435 are formed on the wires respectively.

Referring to FIG. 5b, in an embodiment of this application, the liquid crystal layer 570 has a medium coefficient, and the medium coefficient includes a dielectric coefficient of a parallel vector and a dielectric coefficient of a vertical vector.

In some embodiments of this application, the display panel may include a liquid crystal display (LCD) panel. The LCD panel includes: a switch array (TFT) substrate, a CF substrate, and a liquid crystal layer formed between the two substrates. Alternatively, the display panel may be an organic light-emitting diode (OLED) panel or a quantum dots light-emitting diode (QLED) panel.

According to this application, a gate drive circuit wire load and panel power can be reduced.

The wordings such as "in some embodiments" and "in various embodiments" are repeatedly used. The wordings usually refer to different embodiments, but they may also refer to a same embodiment. The wordings, such as "comprise", "have" and "include", are synonyms, unless other meanings are indicated in the context thereof.

The foregoing descriptions are merely embodiments of this application, and are not intended to limit this application in any form. Although this application has been disclosed above through the specific embodiments, the embodiments are not intended to limit this application. Any person skilled in the art can make some variations or modifications, which are equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A method for reducing a capacitive load, comprising:
   providing a first substrate;
   forming a first conducting layer on the first substrate;
   forming a first passivation layer on the first conducting layer, wherein the first passivation layer covers the first substrate;
   forming a second passivation layer on the first passivation layer; and
   forming a first electrode layer on the second passivation layer, wherein the first electrode layer covers a part of the first conducting layer and the first passivation layer;
   providing a second substrate, disposed opposite to the first substrate;
   forming a liquid crystal layer on the first electrode layer, wherein the liquid crystal layer is between the first substrate and the second substrate, and covers the second passivation layer; and
   forming a second electrode layer on the second substrate, wherein
   a conductive bridge hole is formed on a wire of the first conducting layer, and the first electrode layer is covered on the first conducting layer; and a voltage signal is transmitted to the first electrode layer and the second electrode layer through the conductive bridge hole, so that a medium coefficient of the liquid crystal layer is approximate to a dielectric coefficient of a parallel vector.

2. The method for reducing a capacitive load according to claim 1, wherein the first conducting layer further comprises a first wire.

3. The method for reducing a capacitive load according to claim 2, wherein at least one conductive bridge hole is formed on the first wire.

4. The method for reducing a capacitive load according to claim 1, wherein the first conducting layer further comprises a second wire.

5. The method for reducing a capacitive load according to claim 4, wherein at least one conductive bridge hole is formed on the second wire.

6. The method for reducing a capacitive load according to claim 1, wherein the first conducting layer further comprises a third wire.

7. The method for reducing a capacitive load according to claim 6, wherein at least one conductive bridge hole is formed on the third wire.

8. The method for reducing a capacitive load according to claim 1, wherein the liquid crystal layer has a medium coefficient, and the medium coefficient comprises a dielectric coefficient of a parallel vector.

9. The method for reducing a capacitive load according to claim 1, wherein the liquid crystal layer has a medium coefficient, and the medium coefficient comprises a dielectric coefficient of a vertical vector.

* * * * *